3,309,767
BRAZING ALLOY AND METHOD OF BRAZING WITH SAME

Lawrence Sama, Seaford, and George T. Pepino, Jr., Westbury, N.Y., assignors to the United States of America as represented by the United States Atomic Energy Commission
No Drawing. Filed Jan. 14, 1960, Ser. No. 2,554
3 Claims. (Cl. 29—494)

The subject invention relates to brazing alloys for brazing niobium and niobium alloys.

Niobium and certain of its alloys, such as niobium-titanium alloys, are of increasing importance because of their excellent strength at high temperatures and their low neutron absorption. In fabricating articles of this material, welding has been successfully resorted to. However, there are many applications where welding is not feasible because of structural complexity and shape of the pieces to be joined. As to these, brazing is preferable.

Since niobium alloys are intended for use at high temperatures in the range of 1800° F. to 2400° F., a satisfactory brazing alloy must have a melting temperature of above 2400° F. On the other hand the melting temperature must not exceed about 2800° F. if undesirable reactions in the base metal are to be avoided. The braze must also be compatible with the base metal under service conditions and with final coatings which may be applied to the base metal to improve its resistance to oxidation. Other qualities common to brazes, such as wettability, flowability and the like, must also be present.

It is the object of this invention to provide a braze and method of brazing that will satisfy the foregoing requirements.

In an effort to provide a suitable brazing alloy, a group of alloys was prepared, mixed with lacquer and placed between pieces of Nb-40 a/o Ti. The expression a/o refers to atomic percent. This group was based on Nb-Ti to which ternary and quaternary additions of nickel and silicon were made. Specific alloys tested were Nb-40 a/o Ti-10 a/o Ni; Nb-40 a/o Ti-10 a/o Si; and Nb-40 a/o Ti-5 a/o Ni-5 a/o Si. The flow points of these alloys were checked by means of an induction heating coil in a vacuum furnace. All the mixtures were found to have excessively high flow temperatures, being considerably above 1500° C. and were not further investigated.

A further effort was then undertaken using the eutectic composition of four binary titanium systems, viz: Ti-10 w/o Si; Ti-15 w/o Fe; Ti-10 w/o Ni and Ti-45 w/o Cr. The expression w/o refers to weight percent. All were observed to have flow points below 1500° C., with Ti-10 w/o Ni giving the smoothest joint.

These binary alloys were next investigated for compatibility with aluminum-silicon which is employed as a coating to improve oxidation resistance of niobium-titanium alloys. Samples of each braze alloy were deposited on a Nb-40 a/o Ti plate which was subsequently dipped in Al-11 w/o Si and then oxidation tested. After fifty hours at 2200° F. the Ti-10 w/o Si area was least affected, the other three alloys showing some signs of spalling and scaling. Further work was therefore concentrated on titanium-silicon alloys in which the silicon varies from 5 to 12 weight percent. The preferred composition is Ti-8.5 w/o Si.

This invention may be more completely understood by reference to the following specific example.

The brazing alloy was prepared by blending elemental powders to form a mixture of Ti-8.5 w/o Si. The powders were then cold pressed at 30 t.s.i. to form a briquette. This was sintered at 1250° C. for one hour and recrushed to —200 mesh. The powder was then suspended in a liquid carrier such as nitrocellulose lacquer and applied with a brush to the parts to be joined. The final brazing was done in a vacuum which is preferred, although an inert atmosphere may also be employed. The brazing temperature was approximately 1450° C. (2640° F.) which temperature was maintained for a period of about ten minutes. At this temperature the braze, which melts at 1330° C. (2425° F.), will flow readily. Subsequently, the brazed workpiece was coated by dipping in aluminum-11 w/o silicon for two minutes at 1700° F. The coated workpiece was diffused for one hour in a 10% aluminum-silicon calorizing mix at 1900° F. and then tested.

The foregoing sample was tested by oxidizing it in air for 64 hours at 2200° F. Upon examination, the brazed joints were found to be in satisfactory condition. The strength of the brazed joints was next tested by butt brazing two short lengths of Nb-40 a/o Ti, each 0.020″ x 5/16″ x 1″. Grip ends of Nb-40 a/o Ti were welded to the brazed section and the assembly was dipped in Al-11 w/o Si. The sample was tested at 2200° F. for 53 hours under a stress of 200 p.s.i. The total extension in a 1″ gauge length was 1.8%. Both the strength and oxidization resistance of the braze were found to be within acceptable limits for service in air at the desired temperature range of 1800° F. to 2400° F.

Joints prepared as described above have been made with pure niobium and with nuclear fueled cores clad with niobium-titanium alloy. These have been successfully tested at high temperatures. The braze material is quite compatible with the aluminum dipping process used to protect niobium-titanium alloys from oxidation at high temperatures. A joint prepared from two pieces of Nb-40 a/o Ti was tested at 2200° F. with a stress of 200 p.s.i. for 100 hours. Although some deformation occurred in the base metal, the brazed joint appeared relatively unaffected. More complex joints have been prepared, coated and tested at 2200° F. in stagnant air and in air moving at high velocities, i.e., approximately Mach 0.5, with little or no deleterious effect on the joint after periods of time up to 65 hours. The latter tests were conducted with composite sheet material consisting of a core containing $UO_2$, clad with a Nb-Ti alloy.

By means of this invention a braze alloy and a method of brazing have been provided for use in joining Nb-Ti alloys. The braze is both strong and oxidation resistant in air at temperatures in the vicinity of 2200° F. and is compatible not only with Nb-Ti but also with Al-Si alloys which are employed as coatings for Nb-Ti to improve the oxidation resistance of the latter at high temperatures.

We claim:

1. A braze for joining niobium and niobium alloys, consisting of an alloy of titanium and 5–12 weight percent silicon in a finely divided state, suspended in a liquid nitrocellulose carrier.

2. A braze as defined in claim 1, wherein the silicon content of the titanium-silicon alloy is approximately 8.5% weight percent and the carrier is a nitrocellulose lacquer.

3. The method of brazing niobium and niobium alloys that consists in applying a finely divided alloy of titanium and 5 to 12 weigh percent silicon suspended in a liquid nitrocellulose carrier to the surfaces to be brazed, heating to a temperature of approximately 2700° F. in a non-oxidizing atmosphere for a period of approximately ten minutes to cause the braze to flow readily, and thereafter permitting the brazed surfaces to cool.

No references cited.

JOHN F. CAMPBELL, *Primary Examiner.*

WILLIAM G. WILES, REUBEN EPSTEIN, *Examiners.*

O. R. VERTIZ, *Assistant Examiner.*